(12) United States Patent
McClure et al.

(10) Patent No.: US 6,920,380 B2
(45) Date of Patent: Jul. 19, 2005

(54) PROTOCOL SELECTION MATRIX FOR IN-VEHICLE NETWORKS

(75) Inventors: Robert E. McClure, Danville, IN (US); David M. Such, Greenwood, IN (US)

(73) Assignee: Dearborn Group, Inc., Farmington Hills, MI (US)

( * ) Notice: Subject to any disclaimer, the term of this patent is extended or adjusted under 35 U.S.C. 154(b) by 0 days.

(21) Appl. No.: 10/666,736

(22) Filed: Sep. 18, 2003

(65) Prior Publication Data

US 2004/0111188 A1 Jun. 10, 2004

Related U.S. Application Data

(60) Provisional application No. 60/411,571, filed on Sep. 18, 2002.

(51) Int. Cl.[7] ............................................. G06F 7/00
(52) U.S. Cl. ....................................................... 701/1
(58) Field of Search .............................................. 701/1

(56) References Cited

U.S. PATENT DOCUMENTS 4,714,923 A * 12/1987 Tassle et al. ............ 340/825.36

* cited by examiner

*Primary Examiner*—Yonel Beaulieu
(74) *Attorney, Agent, or Firm*—Warn, Hoffmann, Miller & LaLone, P.C.

(57) ABSTRACT

A protocol selection matrix adapter that interfaces a host computer to multiple in-vehicle networks. The protocol selection matrix adapter is microprocessor controlled and provides a physical interface to the in-vehicle networks. Further, the control of the protocol selection matrix adapter automatically selects the in-vehicle networks, and the initiation of communications on the detected networks. The protocol selection matrix adapter also is able to reprogram an electronic control unit (ECU) that makes up the in-vehicle network.

20 Claims, 19 Drawing Sheets

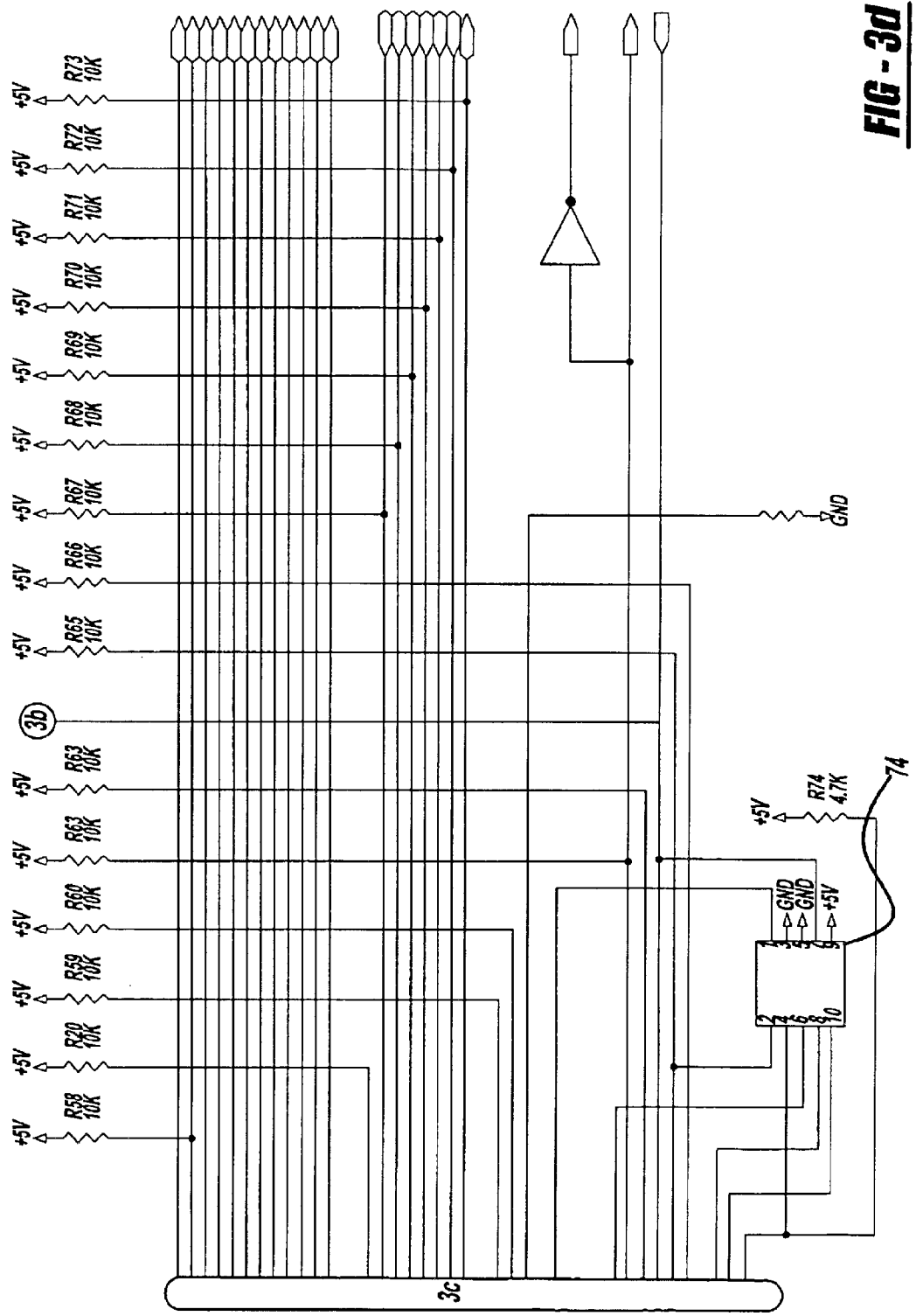

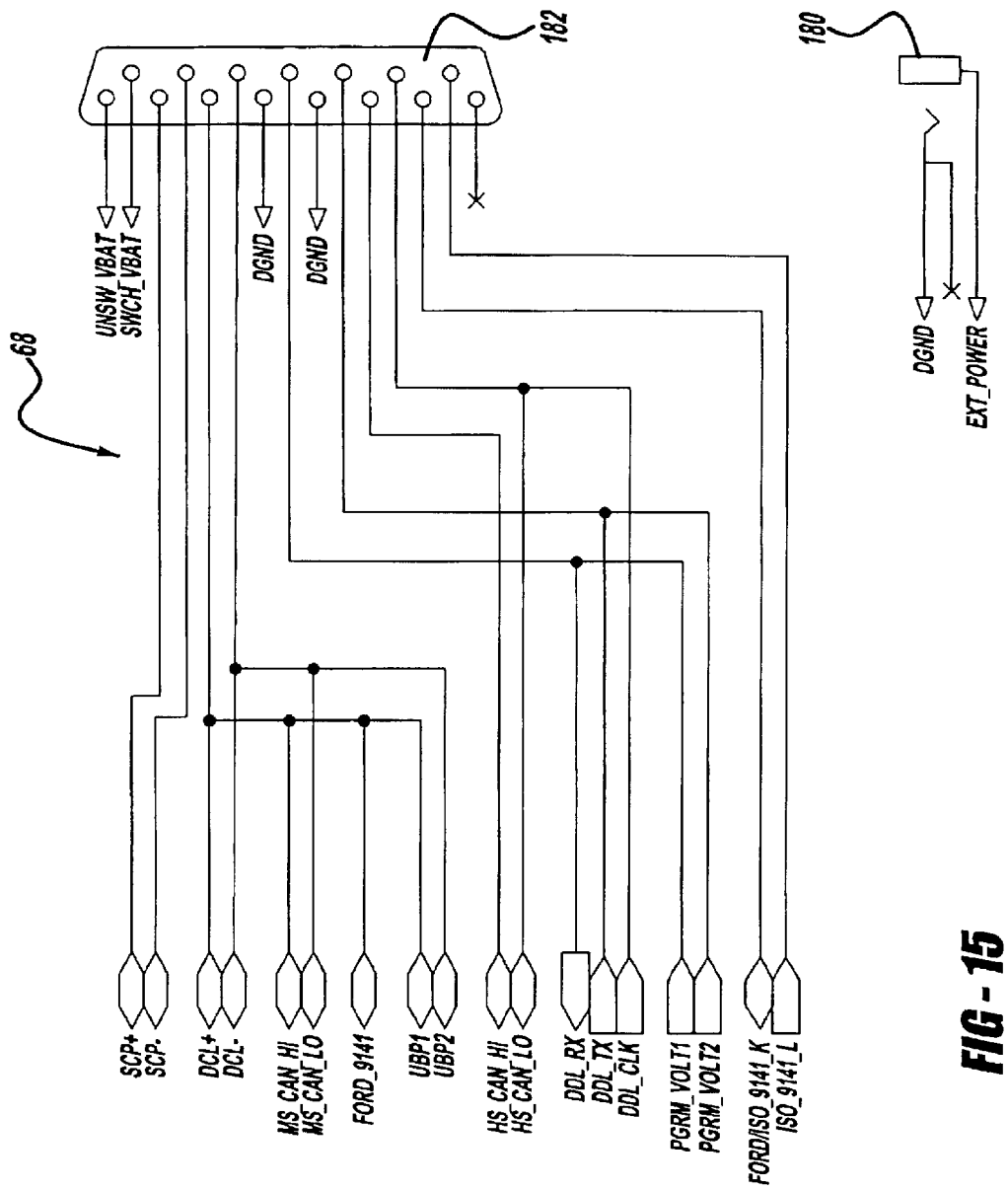

US 6,920,380 B2

PROTOCOL SELECTION MATRIX FOR IN-VEHICLE NETWORKS

CROSS-REFERENCE TO RELATED APPLICATIONS

This application claims the benefit of Provisional Application Ser. No. 60/411,571, filed Sep. 18, 2002, titled Protocol Selection Matrix for In-Vehicle Networks.

BACKGROUND OF THE INVENTION

1. Field of the Invention

This invention relates generally to a protocol selection matrix adapter for a vehicle and, more particularly, to a protocol selection matrix adapter for a vehicle that interfaces a host computer to multiple in-vehicle networks in a vehicle.

2. Discussion of the Related Art

Vehicles employ various networks and systems for diagnostics, analysis and monitoring of certain vehicle systems. These networks can be integrated with a host computer outside of the vehicle for data acquisition, computer-based measurements, automation systems, etc. with vehicle communications and systems.

These various vehicle systems and networks operate under different protocols. Thus, the various vehicle systems and networks may not be compatible with the host computer. Manufacturers of various systems have addressed this capability problem by using an interface box to talk to multiple data links that are customized to a specific product. However, these types of in-vehicle networks have been expanded to included boats, motorcycles, agricultural equipment, construction equipment, military combat systems, etc. Thus, the existing box used to talk to the multiple data links do not provide a very satisfactory solution to this in-vehicle extension. Further, the trend for vehicles is to have multiple networks on the vehicle.

A protocol selection matrix adapter is needed that automatically interfaces multiple in-vehicle networks to a host computer simultaneously for several protocols, and provides a flexible method to reprogram nodes on the in-vehicle networks.

SUMMARY OF THE INVENTION

In accordance with the teachings of the present invention, a protocol selection matrix adapter is disclosed that interfaces a host computer to multiple in-vehicle networks. The protocol selection matrix adapter is microprocessor controlled and provides a physical interface to the in-vehicle networks. The protocol selection matrix adapter automatically selects the in-vehicle networks, and the initiation of communications of detected networks. The protocol selection matrix adapter includes a UART decoder circuit that controls a plurality of universal asynchronous receiver transmitter (UART) transceivers for interfacing a plurality of UART protocols.

The adapter operates in one of four modes, including a vehicle configuration mode where the host computer configures the protocol selection matrix adapter to the vehicle, a stand-alone data collection mode where the protocol selection matrix adapter collects data from an in-vehicle network, a data upload to the host computer mode where the protocol selection matrix adapter uploads the data collected from the vehicle to the host computer, and a pass-through mode where data and other information from a particular in-vehicle network passes directly from the vehicle to the host computer through the adapter. The protocol selection matrix will support simultaneous operations to vehicle protocols, including a UART protocol. The protocol selection matrix adapter also is able to reprogram an electronic control unit (ECU) that makes up the in-vehicle network.

Additional advantages and features of the present invention will become apparent from the following description and appended claims, taken in conjunction with the accompanying drawings.

BRIEF DESCRIPTION OF THE DRAWINGS

FIG. 15 is a schematic block diagram of an input/output interface circuit of the adapter shown in FIG. 2.

DETAILED DESCRIPTION OF THE EMBODIMENTS

The following discussion of the embodiments of the invention directed to a protocol selection matrix adapter for interfacing multiple in-vehicle networks to a host computer is merely exemplary in nature, and is in no way intended to limit the invention or its applications or uses.

Figure 1:
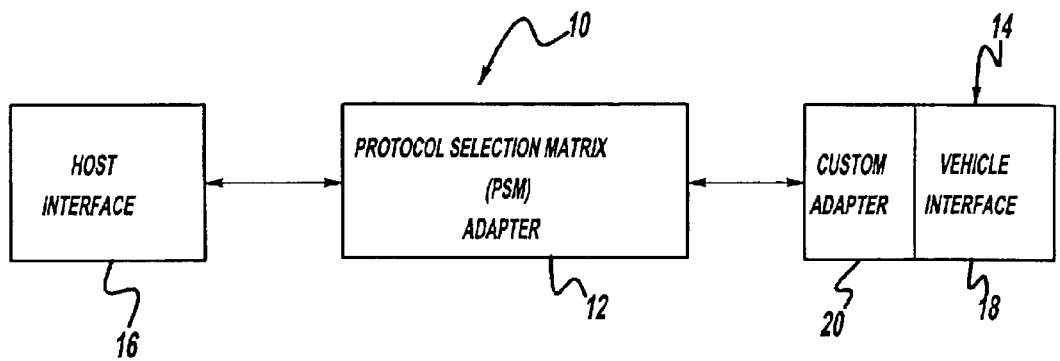
FIG. 1 is a block diagram of a protocol selection matrix adapter, according to an embodiment of the present invention, coupled to a vehicle and a host computer.

FIG. 1 is a block diagram of a vehicle system 10 employing a protocol selection matrix (PSM) adapter 12, according to an embodiment of the present invention. The PSM adapter 12 interfaces a vehicle 14 to a host computer 16, such as a personal computer (PC), to allow the computer 16 to communicate with vehicle networks and systems through a vehicle interface connector 18 over various protocols. The PSM adapter 12 interfaces the computer 16 to multiple in-vehicle networks within the vehicle 14 for data acquisition, measurements, diagnostics, etc. As will be discussed in more detail below, the PSM adapter 12 employs a microprocessor and associated circuitry that control analog switches to dynamically control what pins the vehicle interface 18 are enabled. The PSM adapter 12 would be configured by the host computer 16 to communicate with the vehicle interface 18. The vehicle interface 18 would be accessed to the PSM adapter 12 through a customized vehicle adapter 20 that routes the selected pins to the appropriate vehicle connector pins.

The PSM adapter 12 operates in one of four modes at any given time. These modes include a vehicle configuration mode where the host computer 16 configures the PSM adapter 12 to the vehicle 14; a stand-alone data collection mode where the PSM adapter 12 is collecting data from the particular in-vehicle network; a data upload to the host computer mode where the PSM adapter 12 is uploading the data collected from the vehicle 14 to the host computer 16; and a pass-through mode where data and other information from the particular in-vehicle network passes directly from the vehicle 14 to the host computer 16 through the PSM adapter 12. In one embodiment, the PSM adapter 12 will support the simultaneous operation of two vehicle protocols, with the exception that only one can be a UART protocol.

The PSM adapter 12 supports each of the following protocols.

SAE J1850, Ford Standard Corporate Protocol (SCP);
SAE J2284, Dual-wire Controller Area Network (CAN) Protocol;
ISO 9141 Ford, UART Protocol;
ISO 9141-2, CARB UART Protocol;
Key Word Protocol (KWP)-2000;
Ford Data Communications Link (DCL) UART Protocol;
Ford UART Based Protocol UBP; and
Nissan Diagnostic Data Link (DDL) UART Protocol.

The PSM adapter 12 selects which in-vehicle protocol and programming voltage line are in use based on the configuration down-loaded by the host computer 16. The PSM adapter 12 provides full speed simultaneous operation of three connections, including protocols and/or programming voltage lines. When the PSM adapter 12 is coupled to the vehicle 14, the adapter 12 automatically initiates a sequence of protocol tests that enable analog line switches to the vehicle 14 to enable communications. The data is manipulated and time-stamped to provide a standard output to the computer 16. The output of the adapter 12 coupled to the host computer 16 is not restricted by the computer's operating system.

The PSM adapter 12 also is able to reprogram electronic control units (ECUs) within the vehicle 14. The programming voltage output is switched in conjunction with a selected in-vehicle network. This provides a technique for updating the firmware within the ECUs as changes occur, or to monitor the parameters within an ECU for testing purposes.

Figure 2A:
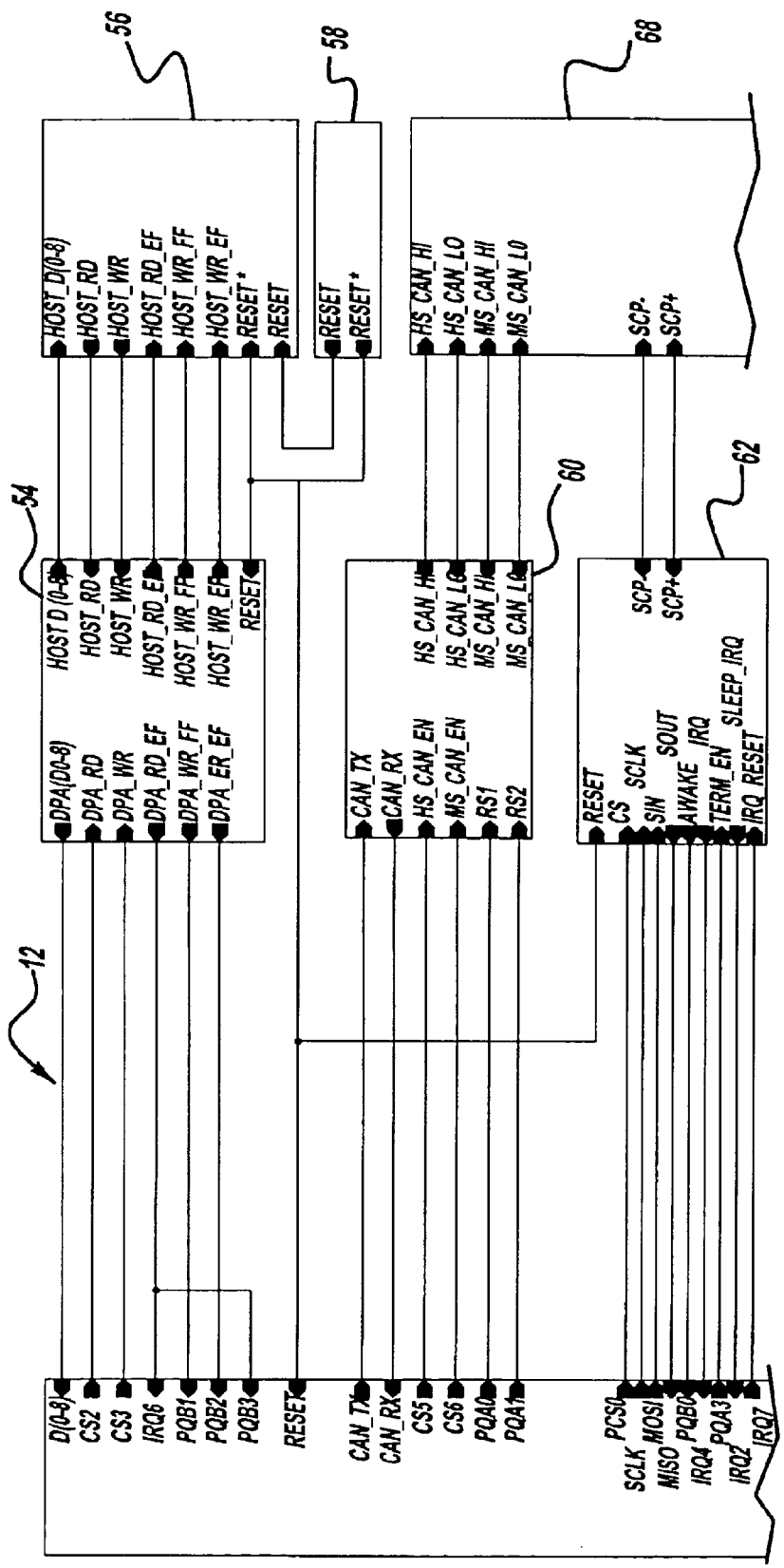
FIG. 2 is a schematic block diagram of the protocol selection matrix adapter shown in FIG. 1.
Figure 2B:
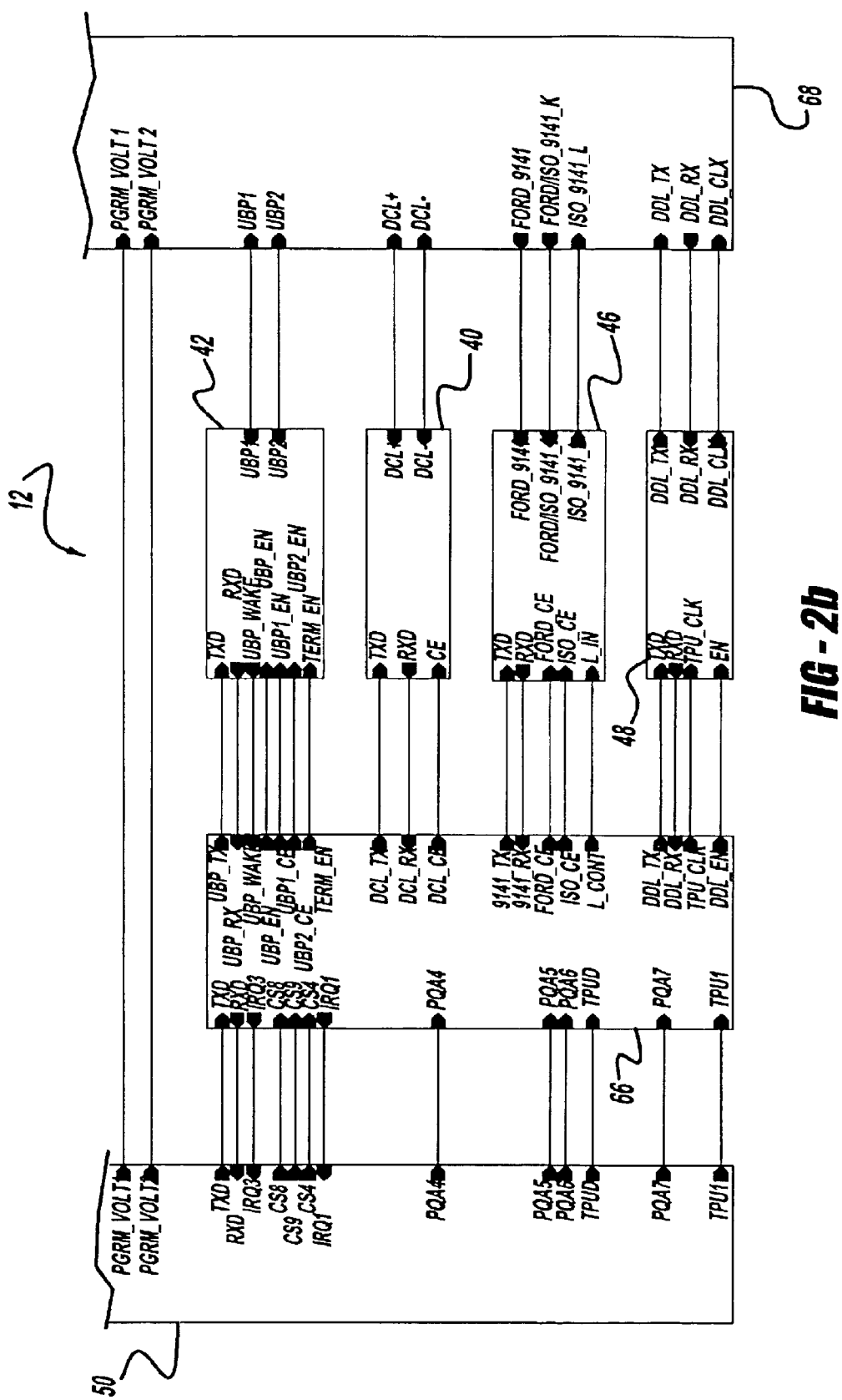

FIG. 2 is a schematic block diagram of the PSM adapter 12. The adapter 12 includes a protocol central processing unit (CPU) circuit 50, a first-in/first-out (FIFO) memory circuit 54, a host interface circuit 56, a power supply circuit 58, a controller area network (CAN) transceiver circuit 60, a standard corporate protocol (SCP) transceiver circuit 62, a UART decoder circuit 66, an input/output interface circuit 68, a data communications link (DCL) transceiver circuit 40, a UART based protocol (UBP) transceiver circuit 42, an ISO 9141 transceiver circuit 46, and a diagnostics data link (DDL) transceiver circuit 48.

Figure 3A:
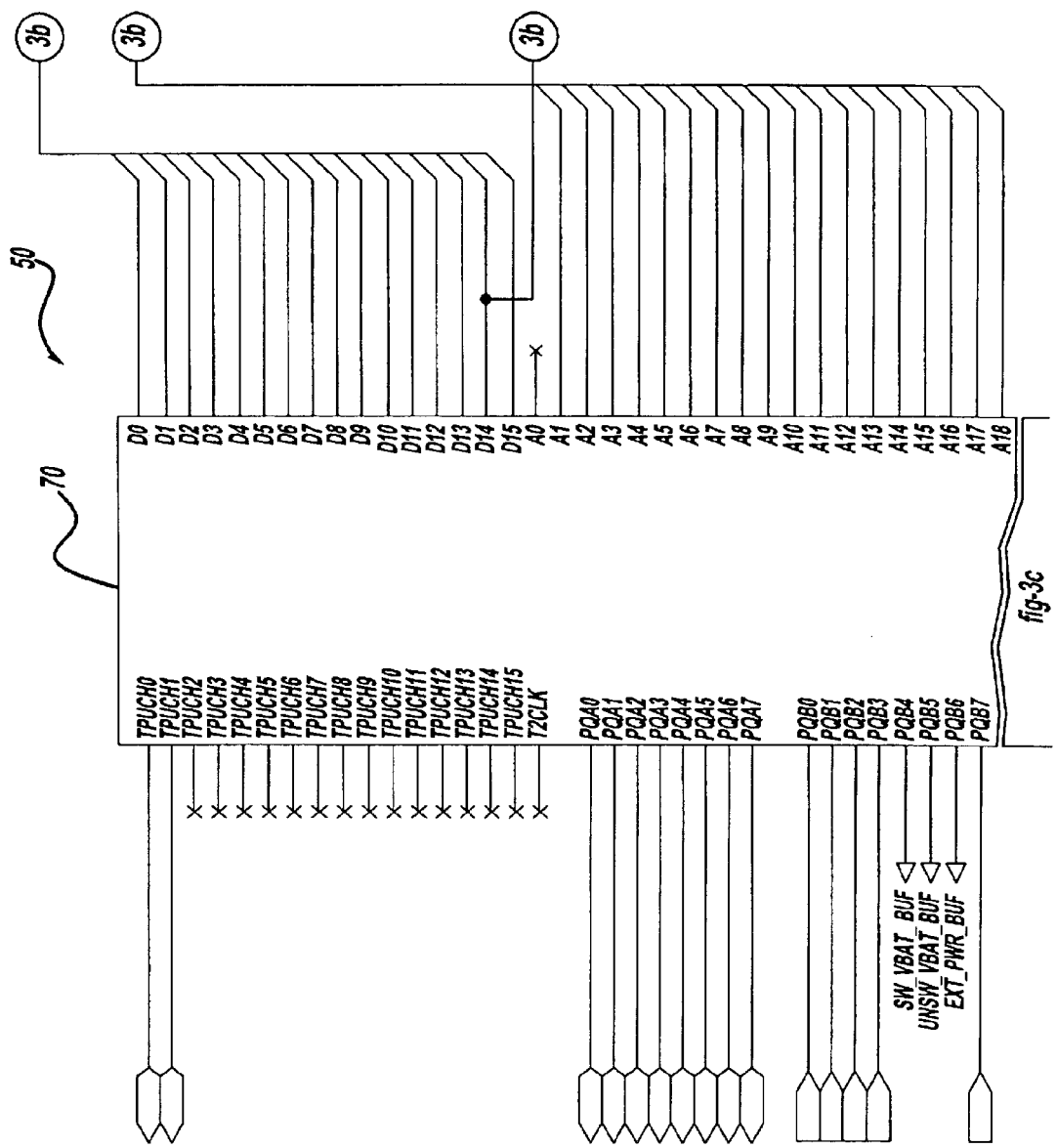
FIG. 3 is a schematic block diagram of a CPU circuit of the adapter shown in FIG. 2.
Figure 3B:
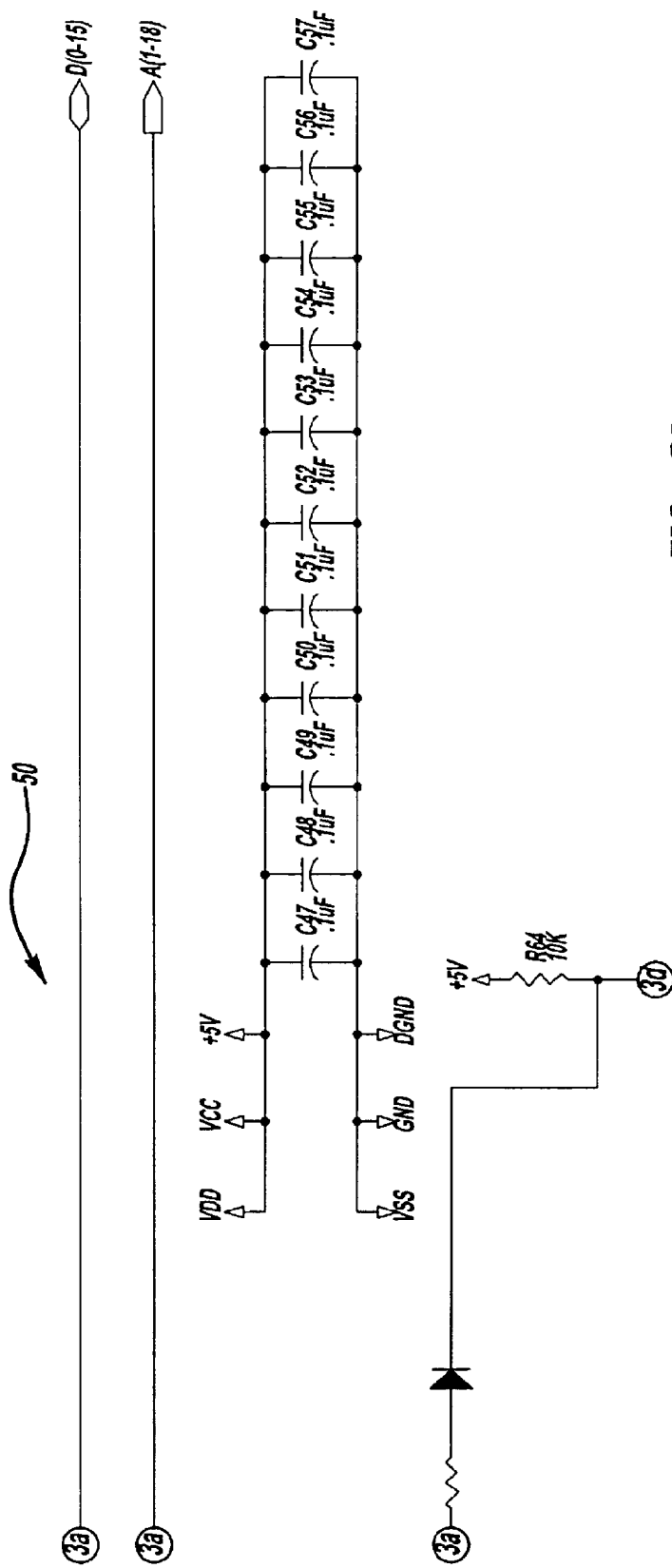
Figure 3C:
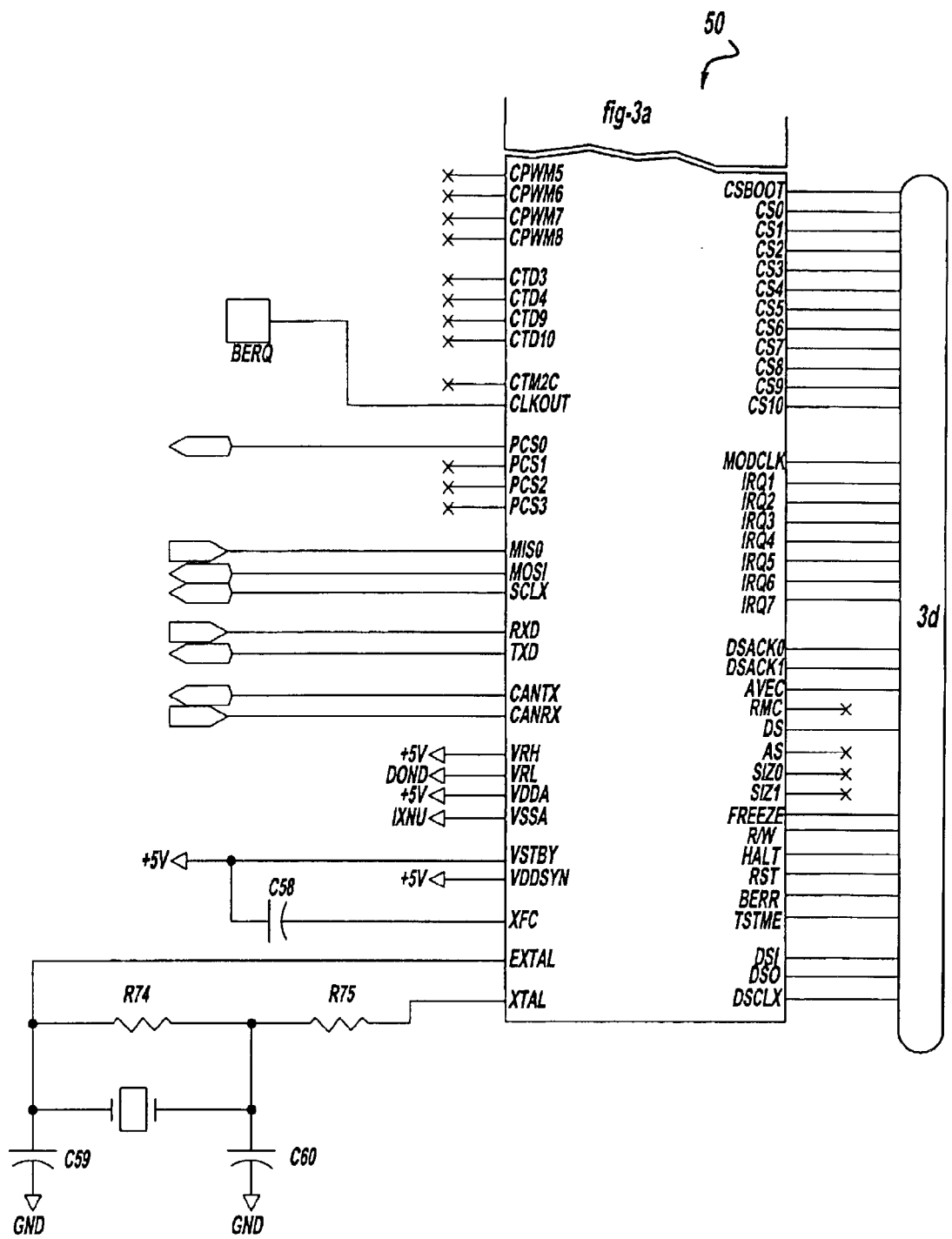

FIG. 3 is a schematic block diagram of the CPU circuit 50 that includes a CPU 70, such as a Motorola 68376 CPU, that operates at 25 MHz. The CPU circuit 50 is responsible for all vehicle network protocol interactions, low level filtering of all incoming messages, data transfer to the host computer 16 in a standard format, time stamping, broadcast functionality, and communications to the host computer 16. The CPU circuit 50 will interface to all enabled vehicle communications links and provide low-level filtering. In addition, the CPU circuit 50 provides full speed simultaneous operation of two protocols.

Figure 4A:
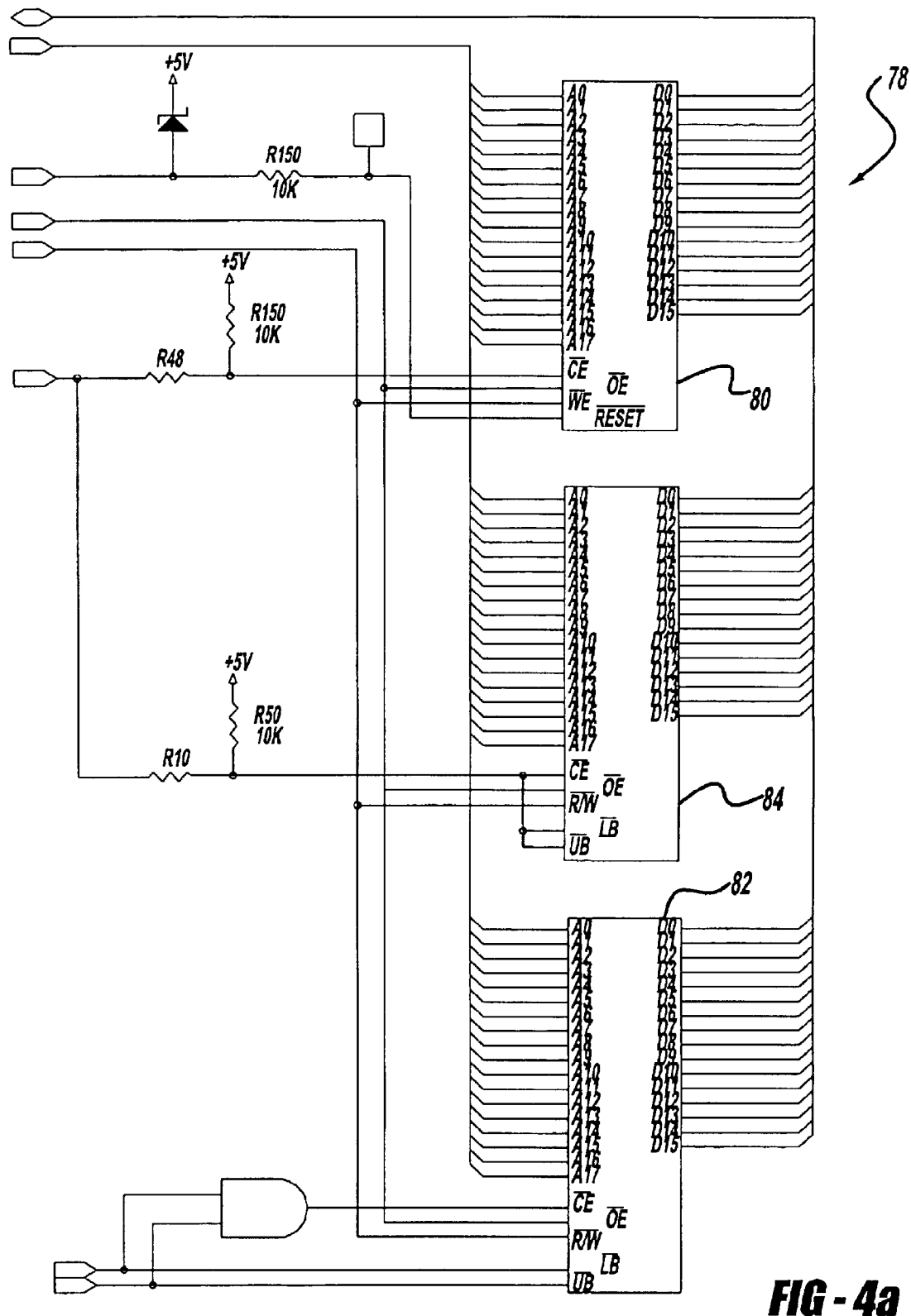
FIG. 4 is a schematic block diagram of a flash memory circuit of the adapter shown in FIG. 2.
Figure 4B:
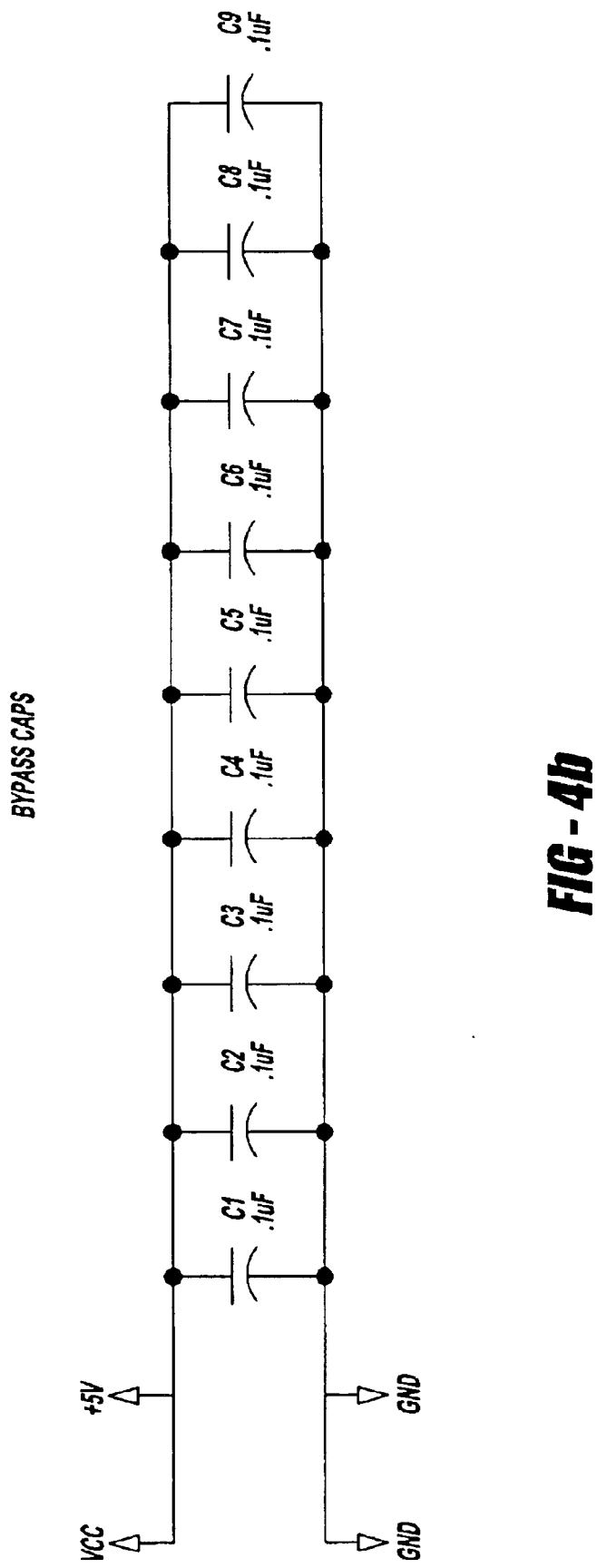

The CPU circuit 50 also includes a background debug mode (BDM) connector 74 that is used to program a 4 MB flash memory 78, shown by schematic block diagram in FIG. 4. The flash memory 78 includes two 4 MB static RAMs 80 and 82. The RAMs 80 and 82 store operating instructions for the adapter 10. The static RAMs 80 and 82 are used to store data from the in-vehicle networks and time-stamping, and are utilized in the reflash processes for temporary storage. A 4 MB static RAM 84 is used as a temporary storage in the reflash process for the RAM 80.

Figure 5A:
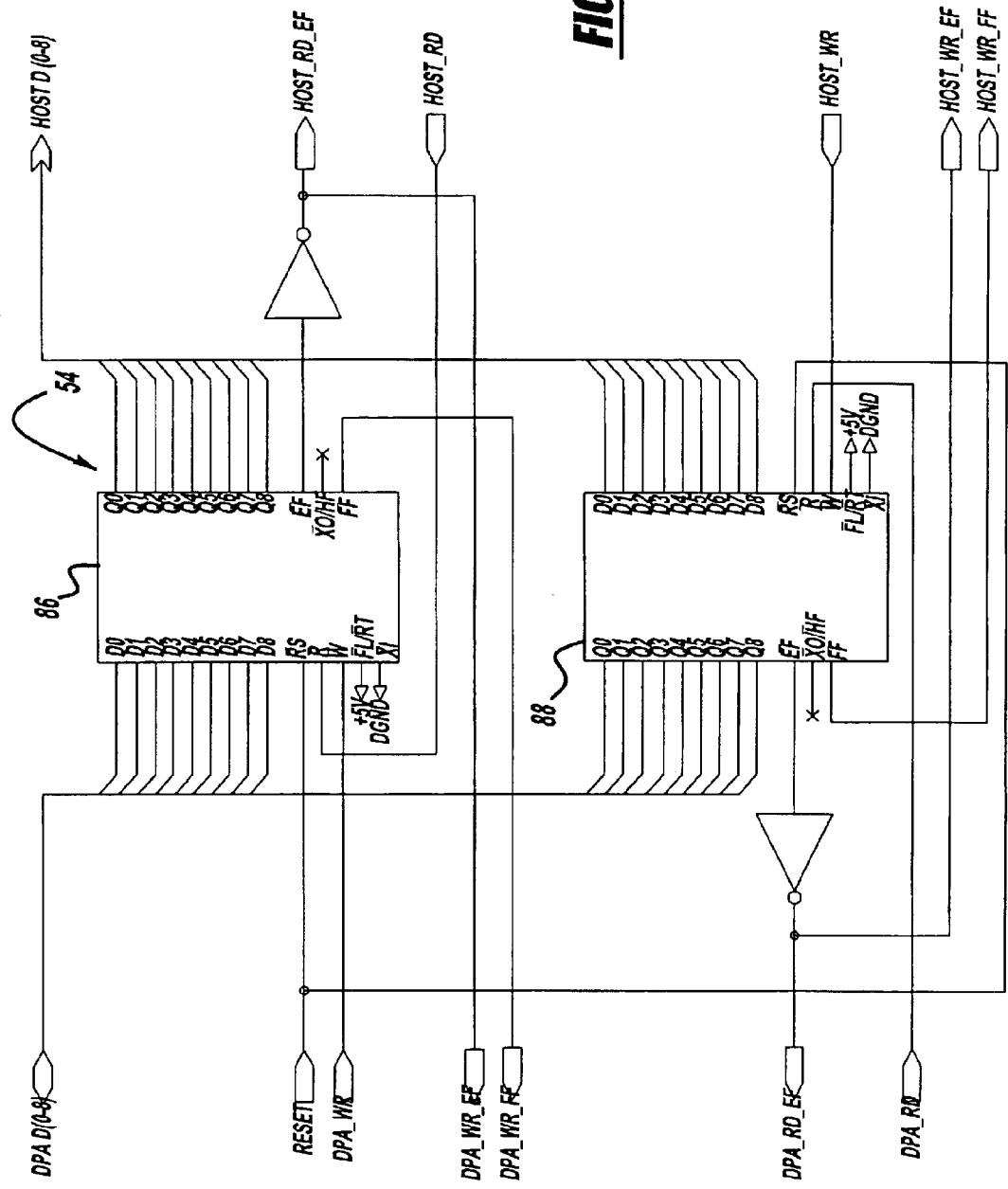
FIG. 5 is a schematic block diagram of an FIFO memory circuit of the adapter shown in FIG. 2.
Figure 5B:
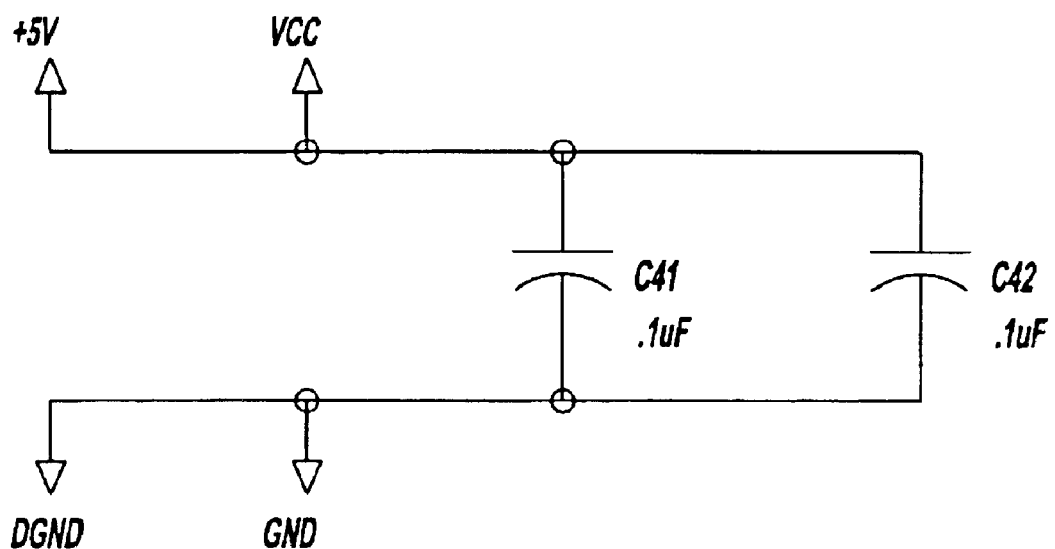

FIG. 5 is a schematic block diagram of the FIFO memory circuit 54 and includes two FIFO memories 86 and 88 for host data read and host data write, respectively. The CPU 70 communicates to the host computer 16 through the host data read FIFO memory 86 and the host data write FIFO memory 88.

Figure 6:
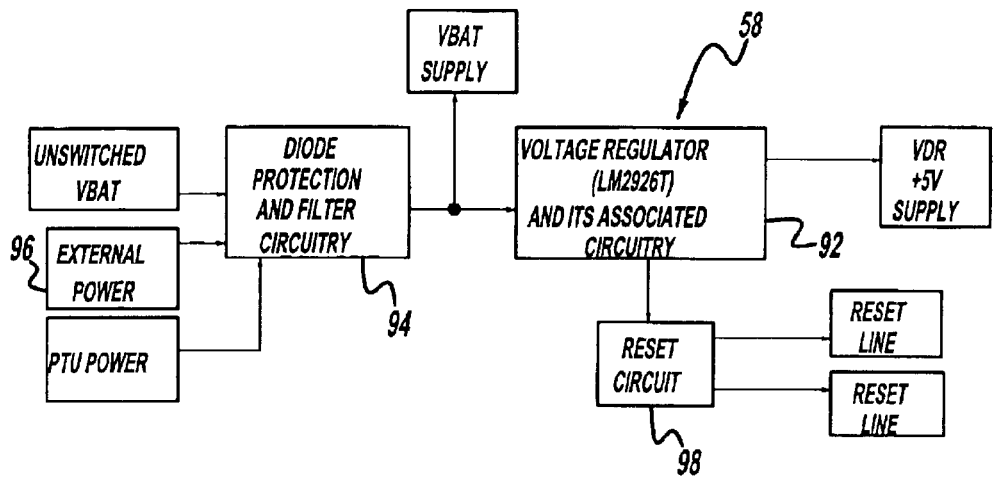
FIG. 6 is a schematic block diagram of a power supply circuit of the adapter shown in FIG. 2.

FIG. 6 is a schematic block diagram of the power supply circuit 58 that includes a low drop-out voltage regulator 92 with a delayed reset that converts a vehicle batter voltage (8–18 volts DC) to a regulated 5 volt DC for adapter operation. The power supply circuit 58 includes a reset circuit 98 that provides the delayed reset output to the custom adapter 20 and the host computer 16. The power supply circuit 58 has protection against transient voltages, reverse polarity, and double battery jump (+/−24 volts DC) events. The circuit 58 includes inline diodes and a filter clamping circuit 94 that provide this protection. Some vehicles do not supply a vehicle battery voltage output at the vehicle interface 18, so the circuit 58 includes an external power connector 96 so that an external power adapter can be employed. All supply voltages are diode isolated from each other, and resistive type regulators are used for power regulation. This will help to achieve the EMI requirements. The power supply circuit 58 will electrically isolate the host computer 16 from any vehicle, or external power supply, if both are connected at the same time.

Figure 7:
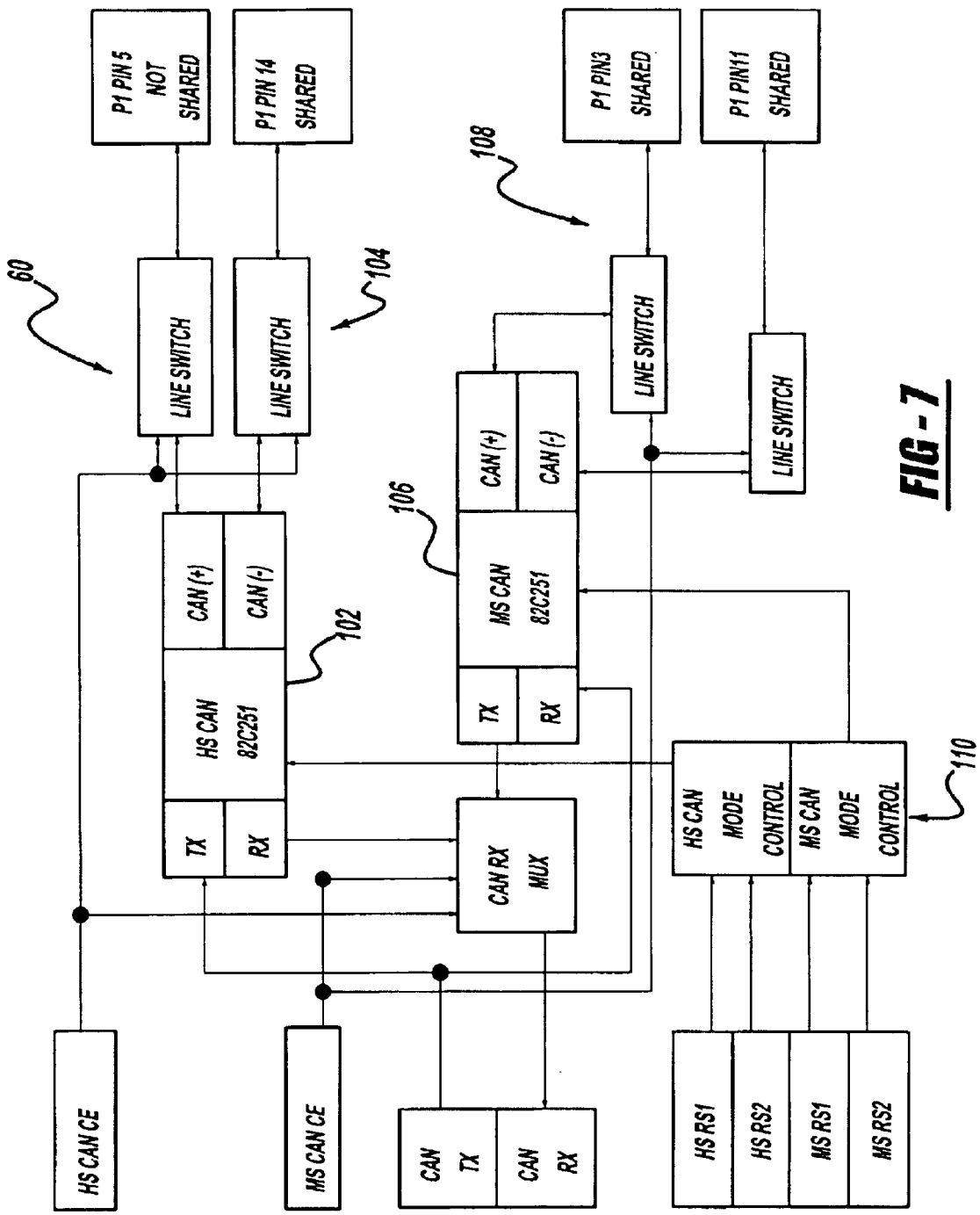
FIG. 7 is a schematic block diagram of a CAN transceiver circuit of the adapter shown in FIG. 2.

FIG. 7 is a schematic block diagram of the CAN transceiver circuit 60 for providing the CAN protocol interface between the vehicle 14 and the host computer 16. The circuit 60 includes two CAN channels, where only one CAN channel can operate at any one time. The CAN circuit 60 includes a high-speed mode transceiver 102 that operates up to 500 kbps. The transceiver 102 is coupled to the vehicle 14 by a line switch integrated circuit 104. The CAN circuit 60 also includes a medium-speed mode transceiver 106 that operates at 125 kbps or less. The transceiver 106 is coupled to the vehicle 14 by a line switch integrated circuit 108. Because only one CAN channel can operate at one time, the circuit 60 employs drive control lines 110 to enable only one of the channels or to disable both channels.

Figure 8:
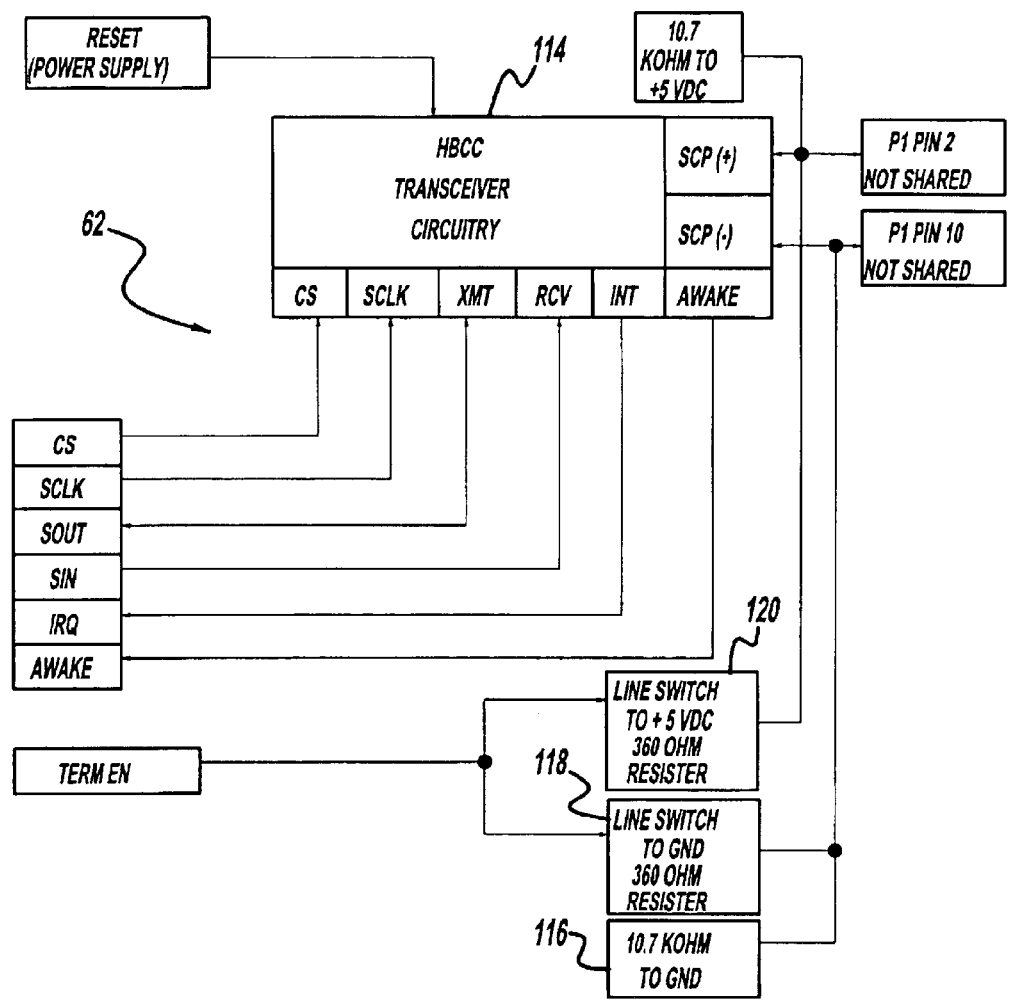
FIG. 8 is a schematic block diagram of an SCP circuit of the adapter shown in FIG. 2.

FIG. 8 is a schematic block diagram of the SCP circuit 62, such as an SAE J1850 SCP circuit for providing the SCP protocol interface between the vehicle 14 and the host computer 16. The circuit 62 includes a transceiver 114 operating at 41.6 kbps or 83.3 kbps. The SCP circuit 62 is a two wire differential protocol with each output coupled to a resistor 116. Each communications line connects to a line switch integrated circuit 118 so as to independently switch a termination resistor 120 when required.

Figure 9:
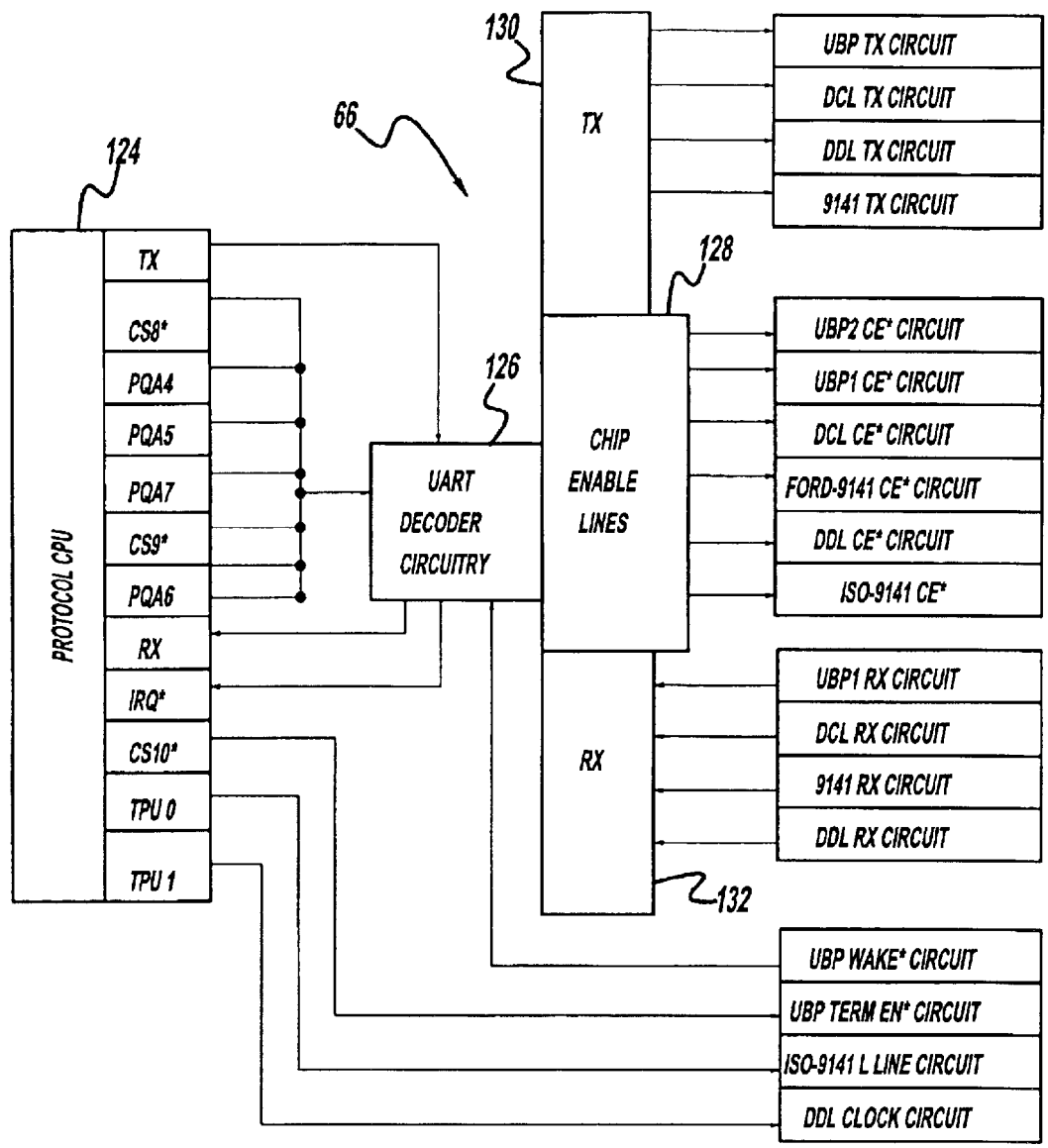
FIG. 9 is a schematic block diagram of a UART decoder circuit of the adapter shown in FIG. 2.

FIG. 9 is a schematic block diagram of the UART decoder circuit 66 for decoding the UART protocols. The decoder circuit 66 includes a protocol CPU 124, a UART decoder 126, chip enable lines 128, a transmitter 130 and a receiver 132 that operate to enable a UART protocol. The UART decoder circuit 66 employs five UART based physical layers including UBP1/UBP2, DCL, DDL, 9141 Ford and ISO-9141. The UART decoder 126 uses two quad bus buffer gate integrated circuits to route UART communications between the protocol CPU 124 and the five UART based physical layers through the chip enable lines 126.

Figure 10:
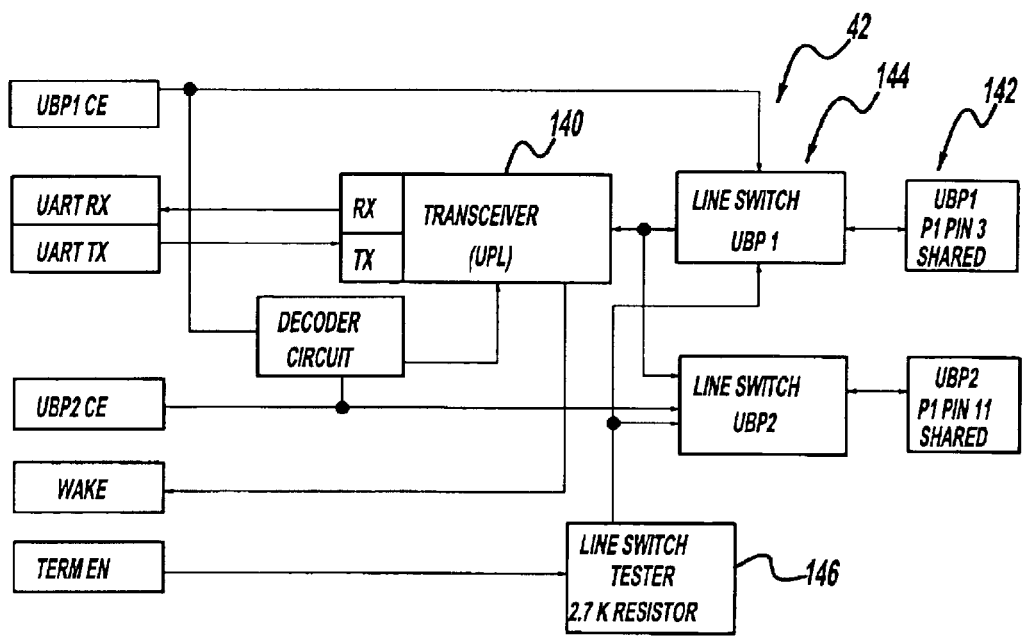
FIG. 10 is a schematic block diagram of a UART based protocol circuit of the adapter shown in FIG. 2.

FIG. 10 is a schematic block diagram of the UBP transceiver circuit 42 for providing the UBP protocol interface between the vehicle 14 and the host computer 16. The circuit 42 includes a transceiver 140 operating at 9600 bps to provide the vehicle interface 18. Two bi-directional communications lines 142 share pins with other protocol outputs on the vehicle interface connector 20. A line switch 144 uses a maximum MAX 46667 integrated circuit to isolate the UBP protocol outputs from a shared pin when not selected. The communications lines 142 are controlled by the UART decoder circuit 66. A pull-up resistor 146 is controlled by the line switch 144 to diagnose network failure conditions.

Figure 11:
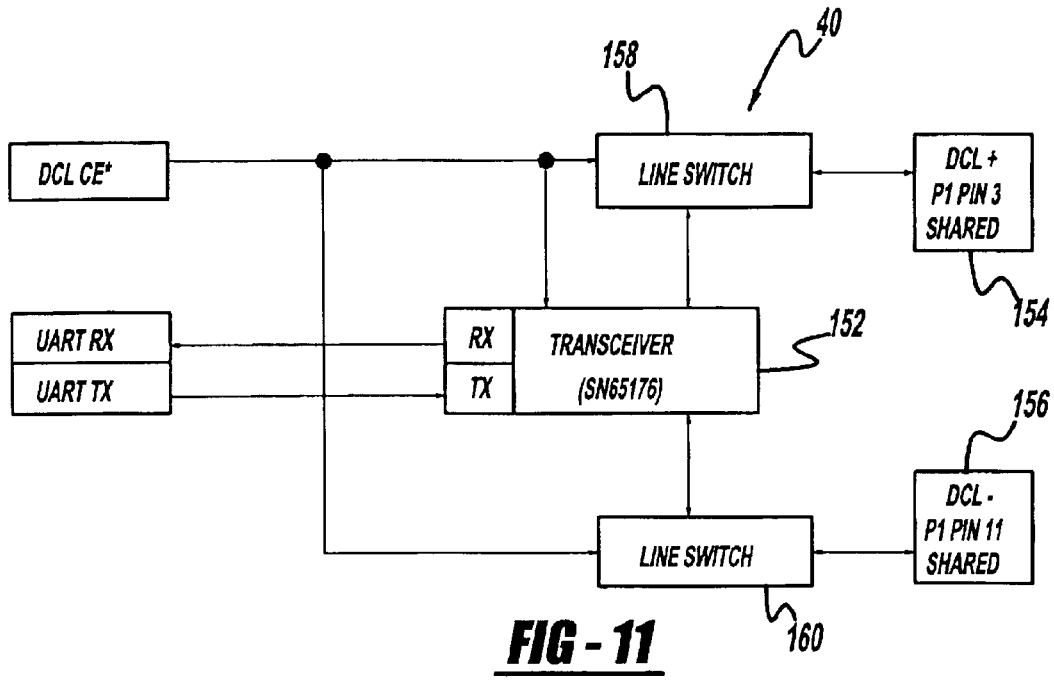
FIG. 11 is a schematic block diagram of a DCL circuit of the adapter shown in FIG. 2.

FIG. 11 is a schematic block diagram of the DCL transceiver circuit 40 for providing the DCL protocol interface between the vehicle 14 and the host computer 16. The circuit 40 includes a transceiver 152 operating at 2400, 4800, 9600 and 19200 bps. The DCL circuit 40 includes two bi-directional communication lines 154 and 156 controlled by the UART decoder circuit 66. The connection to an in-vehicle network is controlled by line switches 158 and 160. The bi-directional communications lines 154 and 156 each share a separate pin with other protocol outputs on the vehicle interface connector 18. The line switches 158 and 160 use a maximum MAX 4667 integrated circuit that is used to isolate the DCL outputs from the shared pins when not selected.

Figure 12:
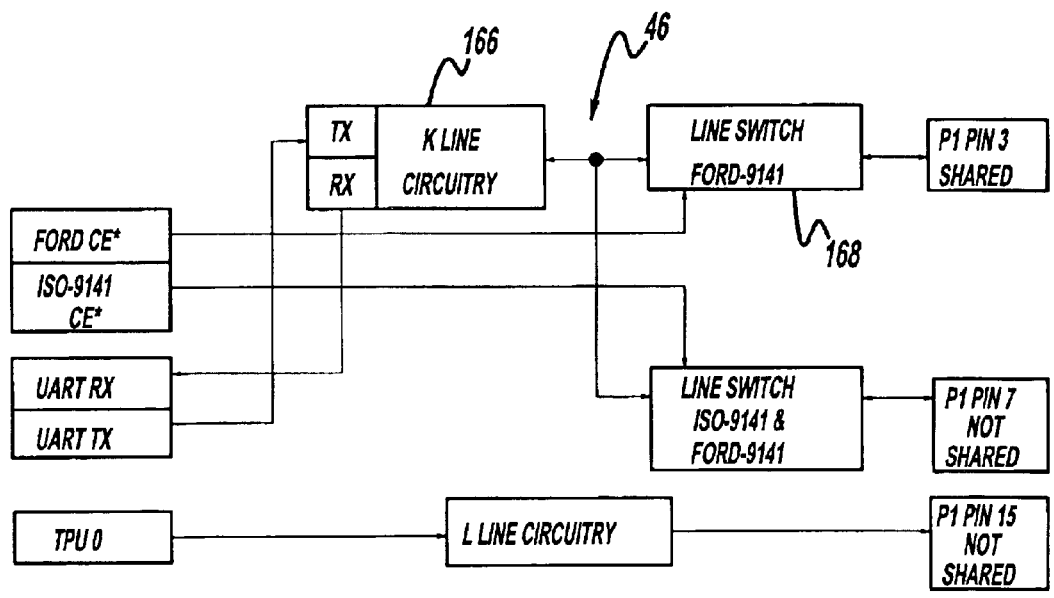
FIG. 12 is a schematic block diagram of an ISO 9141 circuit of the adapter shown in FIG. 2.

FIG. 12 is a schematic block diagram of the ISO 9141 transceiver circuit 46 that supports all ISO 9141 type protocols in key word-2000, and is controlled by the UART decoder circuit 66. The transmit output of the circuit 46 is provided by transistors and associated components. An integrated circuit and associate components handle the receive input. The transmit and receive communications are interfaced to the vehicle 14 on a K-line 166, which is controlled by a line switch 168.

Figure 13:
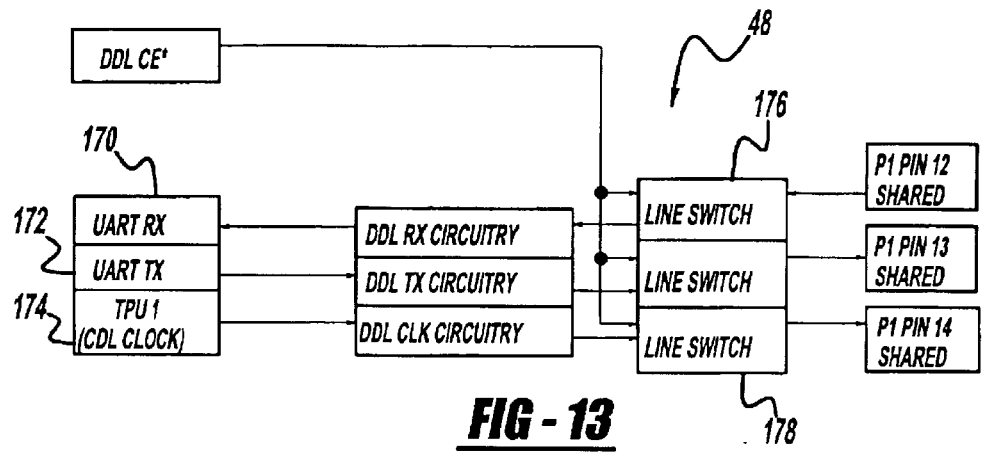
FIG. 13 is a schematic block diagram of a DDL circuit of the adapter shown in FIG. 2.

FIG. 13 is a schematic block diagram of the DDL transceiver circuit 48 for providing the DDL protocol interface between the vehicle 14 and the host computer 16. The circuit 48 includes three communications lines from a UART transmitter 172, a U ART receiver 170 and a clock circuit 174. The data rate of the communications signals is 9600 bps, the clock operates at 153.6 kHz, and the operation is controlled by the UART decoder circuit 66. The transmit output is provided by the transmitter 172 and associated components, and the receive input is provided by the receiver 170 and associated components. The receive circuit 170 and the clock circuit 174 require 9 volt DC for operation, which is provided by an integrated circuit. The transmit output, the receive input and the clock output each share a separate pin with other protocol outputs on the vehicle interface connector 18. The transmit and receive communications are interfaced to the vehicle 14 by a line switch 176, and the clock circuit 174 is interfaced to the vehicle 14 by a line switch 178.

Figure 14:
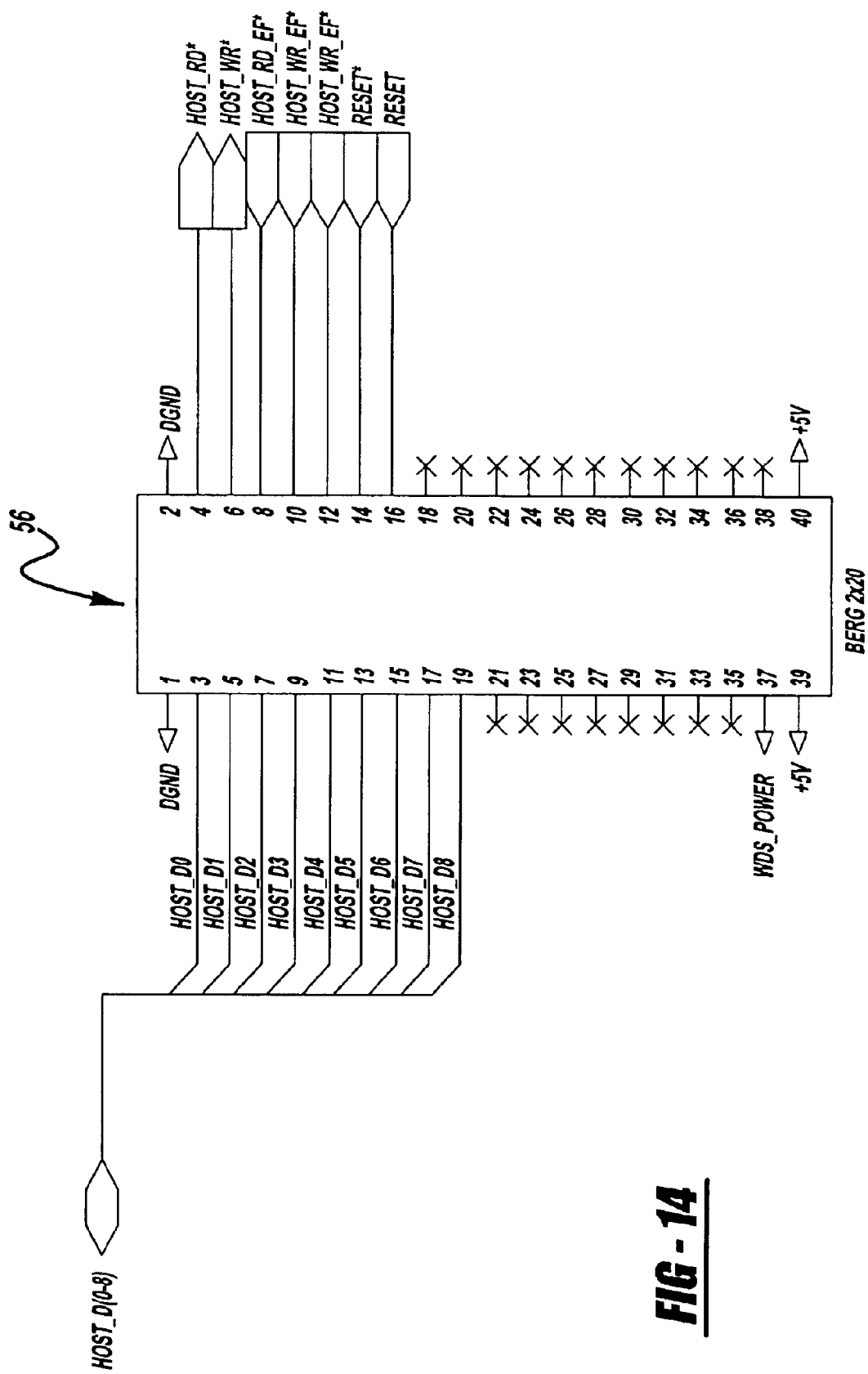
FIG. 14 is a schematic block diagram of a host interface connector circuit of the adapter shown in FIG. 2.

FIG. 14 is a schematic block diagram of the host interface connector circuit 56 that connects the host computer 16 to the CPU circuit 50 using the FIFO memory circuit 54. The connector circuit 56 provides access to the data bus lines and the control lines.

FIG. 15 is a schematic block diagram of the input/output interface circuit 68 including an external power connector 180, and a connector 182 that is used to interface the adapter 12 to an in-vehicle network. Because the connector 182 has 15 pins, many of the protocols share the output pins and are controlled by using line switch integrated circuits. Table I below shows the shared input/output pins to the vehicle interface connector 18.

TABLE I

| DESIGNATOR | SHARED | INPUT/OUTPUT only or BI-DIRECTIONAL | DB-15F CONNECTOR PIN |
|---|---|---|---|
| SCP(+) | NO | BI-DIRECTIONAL | 2 |
| SCP (−) | NO | BI-DIRECTIONAL | 10 |
| DCL (+) | YES | BI-DIRECTIONAL | 3 |
| DCL (−) | YES | BI-DIRECTIONAL | 11 |
| MS CAN (+) | YES | BI-DIRECTIONAL | 3 |
| MS CAN (−) | YES | BI-DIRECTIONAL | 11 |
| UPB1 | YES | BI-DIRECTIONAL | 3 |
| UBP2 | YES | BI-DIRECTIONAL | 11 |
| FORD-9141 K line | YES | BI-DIRECTIONAL | 3 |
| HS CAN (+) | NO | BI-DIRECTIONAL | 6 |
| HS CAN (−) | YES | BI-DIRECTIONAL | 14 |
| FORD-9141 & iso-9141 K line | YES | BI-DIRECTIONAL | 7 |
| ISO-9141 L line | YES | OUTPUT | 15 |
| DDL TX | YES | OUTPUT | 12 |
| DDL RX | YES | INPUT | 13 |
| DDL Clock | YES | OUTPUT | 14 |
| Programming Voltage 1 | YES | OUTPUT | 12 |
| Programming Voltage 2 | YES | OUTPUT | 13 |
| Unswitched VBAT | NO | INPUT | 1 |
| Switched VBAT | NO | INPUT | 9 |

Figure 16:
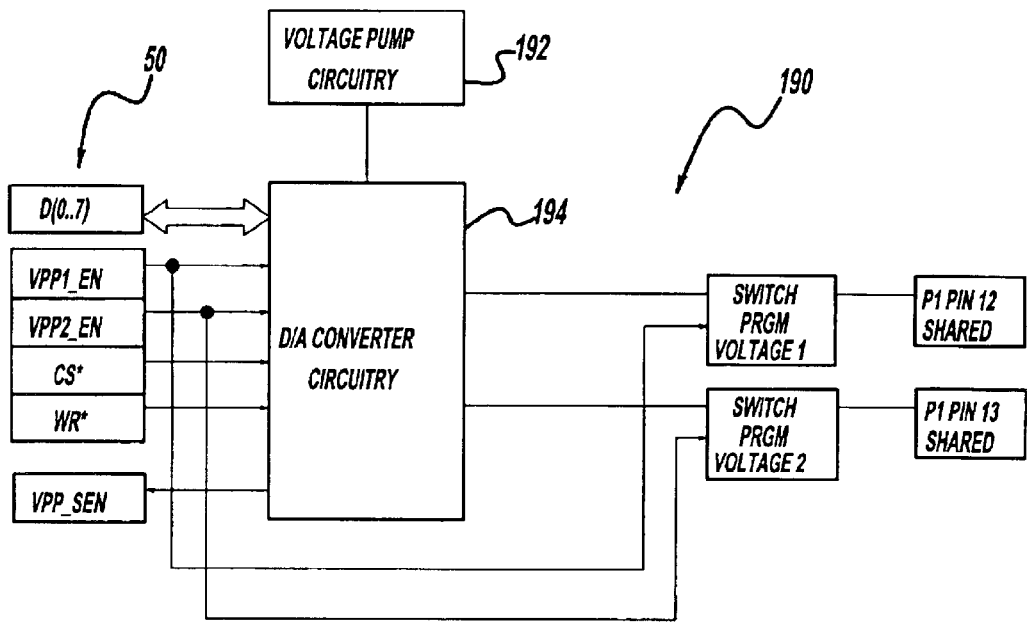
FIG. 16 is a schematic block diagram of a program voltage circuit of the adapter shown in FIG. 2.

FIG. 16 is a schematic block diagram of a program voltage circuit 190 for controlling the voltage in the adapter 12. The circuit 190 includes a voltage pump 192 and associated components that generate a 23.7 volt output to a digital-to-analog (D/A) converter 194. The D/A converter 194 is interfaced to the CPU circuit 50 to produce a programming voltage output in the range of 5–25 volts DC, in 0.1 volt increments, and an output current of 100 ma.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A protocol selection matrix adapter for interfacing a host computer to multiple in-vehicle networks on a vehicle through a plurality of protocols, said adapter comprising:

a protocol central processing unit (CPU) circuit, said CPU circuit providing vehicle network protocol interactions, low level filtering of incoming messages, data and communications transfer to the host computer, time stamping and broadcast functionality operations;

a universal asynchronous receiver transmitter (UART) decoder circuit for decoding UART protocols; and a plurality of transceiver circuits, said transceiver circuits providing a protocol interface between the vehicle and the host computer, wherein the adapter is capable of providing simultaneous support of at least two vehicle protocols.

2. The adapter according to claim 1 wherein the adapter operates in a plurality of modes, including a vehicle configuration mode where the host computer configures the adapter to the vehicle, a stand-alone data collection mode where the adapter collects data from an in-vehicle network, a data upload to the host computer mode where the adapter uploads data collected from the vehicle to the host computer, and a pass-through mode where data and other information from an in-vehicle network passes directly from the vehicle to the host computer through the adapter.

3. The adapter according to claim 1 wherein the adapter supports each of the following protocols:
   SAE J1850, Ford Standard Corporate Protocol (SOP);
   SAE J2284, Dual-wire Controller Area Network (CAN) Protocol;
   ISO 9141 Ford, UART Protocol;
   ISO 9141-2, CARB UART Protocol;
   Key Word Protocol (KWP)-2000;
   Ford Data Communications Link (DCL) UART Protocol;
   Ford UART Based Protocol UBP; and
   Nissan Diagnostic Data Link (DDL) UART Protocol.

4. The adapter according to claim 1 where one of the plurality of transceiver circuits is a controller area network (CAN) transceiver circuit for providing a CAN protocol interface between the vehicle and the host computer.

5. The adapter according to claim 4 wherein the CAN transceiver circuit includes a high-speed mode transceiver and a medium-speed mode transceiver.

6. The adapter according to claim 1 wherein one of the plurality of transceiver circuits is a standard corporate protocol (SCP) transceiver circuit for providing a SCP protocol interface between the vehicle and the host computer.

7. The adapter according to claim 6 wherein the SCP transceiver circuit includes a two wire differential protocol each having an output coupled to a resistor.

8. The adapter according to claim 1 wherein one of the plurality of transceiver circuits is a UART based protocol (UBP) transceiver circuit that is controlled by the UART decoder circuit, said UBP transceiver circuit providing a UBP protocol interface between the vehicle and the host computer.

9. The adapter according to claim 1 wherein one of the pluralities of transceiver circuits is a data communications link (DCL) transceiver circuit that is controlled by the UART decoder circuit, said DCL transceiver circuit providing a DCL protocol interface between the vehicle and the host computer.

10. The adapter according to claim 1 wherein one of the plurality of transceiver circuits is an ISO 9141 transceiver circuit that is controlled by the UART decoder circuit and supports all ISO 9141 type protocols in key word-2000.

11. The adapter according to claim 1 wherein one of the plurality of transceiver circuits is a diagnostic data link (DDL) UART transceiver circuit that is controlled by the UART decoder circuit, said DCL transceiver circuit providing a DCL protocol interface between the vehicle and the host computer.

12. The adapter according to claim 1 wherein the UART decoder circuit employs five UART based physical layers, including UBP1/UBP2, DCL, DDL, 9141 Ford and ISO-9141.

13. The adapter according to claim 12 wherein the UART decoder circuit employs two quad bus buffered gate integrated circuits to route UART communications between the CPU circuit and the five UART based physical layers.

14. The adapter according to claim 1 further comprising a program voltage circuit for controlling the voltage of the adapter, said program voltage circuit including a voltage pump that outputs a voltage signal to a digital-to-analog converter, said converter being interfaced to the CPU to produce a programming voltage within a predetermined range.

15. The adapter according to claim 1 wherein the CPU circuit employs a background debug mode connector that programs a flash memory.

16. The adapter according to claim 1 further comprising two first-in/first-out memory circuits providing a host data read and a host data write between the adapter and the host computer.

17. The adapter according to claim 1 wherein the adapter reprograms electronic control units within the vehicle.

18. A protocol selection matrix adapter for interfacing a host computer to multiple in-vehicle networks on a vehicle through a plurality of protocols, said adapter comprising:
   a protocol central processing unit (CPU) circuit, said CPU circuit providing vehicle network protocol interactions, low level filtering of incoming messages, data and communications transfer to the host computer, time stamping and broadcast functionality operations;
   a universal asynchronous receiver transmitter (UART) decoder circuit for decoding UART protocols; and
   a plurality of transceivers, said transceivers providing a protocol interface between the vehicle and the host computer, wherein the adapter is capable of providing simultaneous support of at least two vehicle protocols, said plurality of transceivers including a controller area network (CAN) transceiver for providing a CAN protocol interface between the vehicle and the host computer, a standard corporate protocol (SCP) transceiver for providing a SOP protocol interface between the vehicle and the host computer, a UART based protocol (UBP) transceiver that is controlled by the UART decoder circuit, said UBP transceiver providing a UBP protocol interface between the vehicle and the host computer, a data communications link (DCL) transceiver that is controlled by the UART decoder circuit, said DCL transceiver providing a DCL protocol interface between the vehicle and the host computer, an ISO 9141 transceiver that is controlled by the UART decoder circuit and supports all ISO 9141 type protocols in key word-200, and a diagnostic data link (DDL) UART transceiver that is controlled by the UART decoder circuit, said DCL transceiver providing a DCL protocol interface between the vehicle and the host computer.

19. The adapter according to claim 18 wherein the adapter operates in a plurality of modes, including a vehicle configuration mode where the host computer configures the adapter to the vehicle, a stand-alone data collection mode where the adapter collects data from an in-vehicle network, a data upload to the host computer mode where the adapter uploads data collected from the vehicle to the host computer, and a pass-through mode where data and other information from an in-vehicle network passes directly from the vehicle to the host computer through the adapter.

20. The adapter according to claim 18 wherein the UART decoder circuit employs five UART based physical layers, including UBP1/UBP2, DCL, DDL, 9141 Ford and ISO-9141.

* * * * *

UNITED STATES PATENT AND TRADEMARK OFFICE
CERTIFICATE OF CORRECTION

PATENT NO. : 6,920,380 B2
DATED : July 19, 2005
INVENTOR(S) : McClure et al.

Page 1 of 1

It is certified that error appears in the above-identified patent and that said Letters Patent is hereby corrected as shown below:

Column 4,
Line 28, "batter" should be -- battery --.

Column 7,
Line 16, "(SOP)" should be -- (SCP) --.

Column 8,
Line 37, "SOP" should be -- SCP --.
Line 48, "word-200" should be -- word-2000 --.

Signed and Sealed this

Twenty-second Day of November, 2005

JON W. DUDAS
*Director of the United States Patent and Trademark Office*